(12) United States Patent
Delys et al.

(10) Patent No.: US 9,315,682 B2
(45) Date of Patent: Apr. 19, 2016

(54) HEAT-TRANSFER TEXTILE INK

(71) Applicant: Dow Corning Corporation, Midland, MI (US)

(72) Inventors: Nancy Delys, Jurbise (BE); Katherine Hoffee, Whiteland, IN (US); Bertrand Louis Julien Lenoble, Silly (BE); Fernando Vazquez-Carrillo, Summerfield, NC (US)

(73) Assignee: DOW CORNING CORPORATION, Midland, MI (US)

( * ) Notice: Subject to any disclaimer, the term of this patent is extended or adjusted under 35 U.S.C. 154(b) by 26 days.

(21) Appl. No.: 14/367,359

(22) PCT Filed: Dec. 19, 2012

(86) PCT No.: PCT/US2012/070535
§ 371 (c)(1),
(2) Date: Jun. 20, 2014

(87) PCT Pub. No.: WO2013/096402
PCT Pub. Date: Jun. 27, 2013

(65) Prior Publication Data
US 2015/0004336 A1    Jan. 1, 2015

Related U.S. Application Data

(60) Provisional application No. 61/578,914, filed on Dec. 22, 2011.

(51) Int. Cl.

| | | |
|---|---|---|
| *C09D 11/102* | (2014.01) | |
| *C08L 83/04* | (2006.01) | |
| *C08G 77/12* | (2006.01) | |
| *C08G 77/20* | (2006.01) | |
| *C08G 77/46* | (2006.01) | |
| *D06P 5/24* | (2006.01) | |
| *D06Q 1/12* | (2006.01) | |
| *C09D 11/037* | (2014.01) | |
| *B32B 37/00* | (2006.01) | |
| *B32B 37/06* | (2006.01) | |
| *C09J 167/00* | (2006.01) | |

(52) U.S. Cl.
CPC ............ *C09D 11/102* (2013.01); *B32B 37/025* (2013.01); *B32B 37/06* (2013.01); *C08G 77/12* (2013.01); *C08G 77/20* (2013.01); *C08G 77/46* (2013.01); *C08L 83/04* (2013.01); *C09D 11/037* (2013.01); *C09J 167/00* (2013.01); *D06P 5/003* (2013.01); *D06P 5/007* (2013.01); *D06Q 1/12* (2013.01); *B32B 2305/18* (2013.01); *B32B 2383/00* (2013.01); *B32B 2437/00* (2013.01); *Y10T 428/2481* (2015.01)

(58) Field of Classification Search
None
See application file for complete search history.

(56) References Cited

U.S. PATENT DOCUMENTS

| | | |
|---|---|---|
| 3,419,593 A | 12/1968 | Willing |
| 3,445,420 A | 5/1969 | Kookootsedes et al. |
| 3,989,878 A | 11/1976 | Aishima et al. |
| 4,962,076 A | 10/1990 | Chu et al. |
| 5,051,455 A | 9/1991 | Chu et al. |
| 5,053,442 A | 10/1991 | Chu et al. |
| 5,296,298 A | 3/1994 | Fujimoto et al. |
| 5,658,674 A | 8/1997 | Lorenzetti et al. |
| 6,354,620 B1 | 3/2002 | Budden et al. |
| 7,198,854 B2 | 4/2007 | Dumont et al. |
| 2002/0082339 A1 | 6/2002 | Zhou et al. |
| 2003/0057762 A1 | 3/2003 | Kim |
| 2006/0099346 A1 | 5/2006 | Martin et al. |
| 2007/0141250 A1 | 6/2007 | Mei |
| 2007/0166555 A1 | 7/2007 | Ikeno et al. |
| 2007/0281564 A1 | 12/2007 | Mizushima et al. |
| 2010/0190396 A1 | 7/2010 | Nozoe et al. |

FOREIGN PATENT DOCUMENTS

| | | |
|---|---|---|
| GB | 2 143 180 A | 2/1985 |
| JP | H 09-078473 A | 3/1997 |
| WO | WO 2007/039763 A1 | 4/2007 |
| WO | WO 2013/096394 A2 | 6/2013 |

OTHER PUBLICATIONS

International Search Report for Application No. PCT/US2012/070535 dated Sep. 3, 2013, 4 pages.
International Search Report for Application No. PCT/US2012/070520 dated Sep. 3, 2013, 4 pages.
English language abstract and machine-assisted English translation for JPH 09-078473 extracted from the PAJ database on Aug. 21, 2014, 15 pages.

*Primary Examiner* — Marc Zimmer
(74) *Attorney, Agent, or Firm* — Howard & Howard Attorneys PLLC

(57) ABSTRACT

A heat-transfer textile ink product comprising (a) silicone ink base composition; (b) one or more pigments; and (c) a heat-transfer adhesion promoter.

20 Claims, No Drawings

HEAT-TRANSFER TEXTILE INK

This application is the National Stage of International Patent Application No. PCT/US2012/070535, filed on Dec. 19, 2012, which claims priority to and all the advantages of U.S. Provisional Patent Application No. 61/578,914, filed on Dec. 22, 2011, the content of which is incorporated herein by reference.

CROSS-REFERENCE TO RELATED APPLICATIONS

The present invention relates to a heat-transfer textile ink useful for textile coating, in particular for textile coating by a heat-transfer process. The present invention also relates to a laminated heat-transfer product including such a heat-transfer textile ink, and a heat-transfer printing process using such a heat-transfer product.

Silicone ink base compositions, which are in the form of liquids prior to curing and after curing forming elastomeric products, are well-known in the silicone industry. Silicone ink bases are specialized liquid silicone rubbers (LSRs) that have been used in textile printing applications due to the soft hand feel and washing durability of the resulting treated textile.

WO 2007/039763 A1 discloses an improved silicone ink base composition for textile coating which has better film appearance and better physical properties such as softness, low-tackiness, and elongation compared to liquid silicone rubbers (LSRs) previously known.

Meanwhile, 'heat-transfer' printing is a particularly suitable known technique or process for the rapid application of an image from a heat transfer product to various substrates. Heat-transfer products are generally laminates having an image thereon created by one or more coats, which are intended to be used to provided pictorial and/or print designs or messages (e.g. labels, decals, etc.) that can be adhered to substrates in a quick and easy printing process, particularly at the location of substrate sale, or due to the fixed location of the substrate. Substrates include for example textiles and fabrics such as clothing, typically t-shirts and the like, desiring to have the required image only at the point of sale, or vehicle surfaces, hard plastic component parts, etc. which are secured in place and cannot be removed for a separate printing.

However, some currently available silicone inks have difficulty in adhering to some substrates and/or glue during the heat-transfer printing process.

BRIEF SUMMARY OF THE INVENTION

The present invention relates to a heat-transfer textile ink able to provide improved adhesion of the silicone ink base and/or glue(s) to substrates during a heat-transfer printing process. As used herein, the articles "a", "an" and "the" each mean one or more.

DETAILED DESCRIPTION OF THE INVENTION

In one aspect, the present invention provides a heat-transfer textile ink comprising:
(a) a silicone ink base composition;
(b) a pigment; and
(c) a heat-transfer adhesion promoter being one or more of the group comprising:
  (i) a hydrogen bonded silicon;
  (ii) an organosilane; and
  (iii) a metal chelate.

Suitable pigments are known in the art, and are not further discussed in detail. They include all types of pigments, inks, tinctures, dyes, colorants and "colours", and are included in the relevant proportions known in the art to provide the required image quantity and quality. Suitable pigments and dyes include but are not limited to carbon black, titanium dioxide, chromium oxide, bismuth vanadium oxide and the like. In one embodiment of the invention, the pigments and dyes are used in the form of pigment master batches known in the art. The pigments may be dispersed in the heat-transfer textile ink composition at the ratio of 25:75 to 70:30 to the silicone ink base.

The heat-transfer textile ink may include any proportions and/or ratios of the heat-transfer adhesion promoters listed above, such as in the amount of 0.1 wt % to 10 wt %, alternatively in the range 0.5 wt % to 5 wt %.

The hydrogen bonded silicon of group (c) (i) may comprise

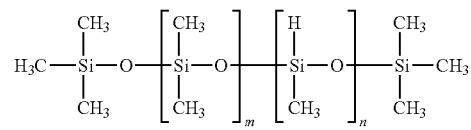

wherein m is in the range 0 and 120, and n is in the range 1 to 120.

Alternatively, the hydrogen bonded silicon optionally has a viscosity of 20 cst, m is 0, n is on average equal to 60, and an average molecular weight of 2500. Alternatively, one or more different hydrogen bonded silicons may be included as the adhesion promoter, Alternatively, the hydrogen bonded silicon is provided in a molar ratio of at least 1.5 compared with the amount of alkenylorganosiloxane of the silicone ink base as discussed hereinafter.

The organosilane of group (c) (ii) may be a silane, an oligomeric reaction product of the silane, or a combination thereof, in particular an alkoxysilane. Alternatively, one or more different organosilanes may be included, alternatively two.

Alternatively, the organosilane may comprise either: (i) the formula $R^3_b SiR^4_{(4-b)}$, where each $R^3$ is independently a monovalent organic group; each $R^4$ is an alkoxy group; and b is 0, 1, 2, or 3; or (ii) the formula $R^5_c R^6_d Si(OR^5)_{4-(c+d)}$ where each $R^5$ is independently a substituted or unsubstituted, monovalent hydrocarbon group having at least 1 carbon atom and each $R^6$ contains at least one SiC bonded group having an adhesion-promoting group, such as amino, epoxy, mercapto or acrylate groups, c is 0, 1 or 2, d is 1 or 2, and the sum of c+d is not greater than 3, or a partial condensate thereof.

The organosilane may comprise an alkoxysilane exemplified by a dialkoxysilane, such as dialkyldialkoxysilane or a trialkoxysilane, such as an alkyltrialkoxysilane or alkenyltrialkoxysilane, or partial or full hydrolysis products thereof, or another combination thereof. Examples of suitable trialkoxysilanes include methyltrimethoxysilane, methyltriethoxysilane, ethyltrimethoxysilane, ethyltriethoxysilane, phenyltriethoxysilane, phenyltrimethoxysilane, vinyltrimethoxysilane, vinyltriethoxysilane, and a combination thereof. Examples of alkoxysilane crosslinkers are disclosed is U.S. Pat. Nos. 4,962,076; 5,051,455; and 5,053,442.

Alternatively, the organosilane may comprise a dialkoxysilane selected from chloromethylmethyldimethoxysilane, chloromethylmethyldiethoxysilane, dimethyldimethoxysilane, methyl-n-propyldimethoxysilane, (2,-dichlorocyclopropyl)-methyldimethoxysilane, (2,2-difluorocyclopropyl)-methyldiethoxysilane, (2,2-dichlorocyclopropyl)-methyldiethoxysilane, fluoromethyl-methyldiethoxysilane, fluoromethyldimethoxysilane, or a combination thereof.

Alternatively the organosilane may comprise a trialkoxysilane selected from methyltrimethixysilane, ethyltrimethoxysilane, propyltrimethoxysilane, isobutyltrimethoxysilane, cyclopentyltrimethoxysilane, hexyltrimethoxysilane, phenyltrimethoxysilane, 2-ethyl-hexyltrimethoxysilane, 2,3-dimethylcyclohexyltrimethoxysilane, glycidoxypropyltrimethoxysilane, aminoethylaminopropyltrimethoxysilane, (ethylenediaminepropyl)trimethoxysilane, 3-methacryloxypropltimethoxyilane, chloromethyltrimethoxysilane, 3-chloropropyltrimethoxysilane, trichlorophenyltrimethoxysilane, 3,3,3-trifluoropropyltrimethoxysilane, 4,4,4,3,3-pentafluorobutyltrimethoxysilane, 2,2-difluorocyclopropyltriethoxysilane, methyltriethoxysilane, cyclohexyltriethoxysilane, chloromethyltriethoxysilane, tetrachlorophenyltriethoxysilane, fluoromethyltriethoxysilane, methyltriisopropoxysilane, methyl-tris(methoxyethoxy)silane, n-propyl-tris(3-methoxysthoxy)silane, phenyltris(methoxyethoxy)silane, vinyltrimethoxysilane, vinyltriethoxysilane, or a combination thereof.

Alternatively, the organosilane may comprise a tetraalkoxysilane selected from tetraethoxysilane, tetrapropoxysilane, tetrabutoxysilane, or a combination thereof.

Alternatively, the organosilane is one or more of the group comprising a trialkoxysilane such as vinyltriethoxysilane, (methacryloxypropyl)trimethoxysilane, vinyltrimethoxysilane, vinyltriacetoxysilane, glycidoxypropyltrimethoxysilane, and combinations thereof.

Alternatively, the organosilane group is a trialkoxysilane selected from aminoethylaminopropyltrimethoxysilane, (ethylenediaminepropyl)trimethoxysilane, 3-methacryloxypropyltrimethoxysilane, vinyltrimethoxysilane, vinyltriethoxysilane, or a combination thereof. Other examples include phenyltrimethoxysilane and isobutyltrimethoxysilane, The metal chelate of group (c)(iii) may comprise any suitable metal (such as zirconium (IV) or titanium), in the form of suitable chelate complexes such as tetraacetylacetonate, hexafluoroacetylacetonate, trifluoroacetylacetonate, tetrakis(ethyltrifluoroacetylacetonate), tetrakis(2,2,6,6-tetramethyl-heptanedionato), dibutoxy bis(ethylacetonate), diisopropoxy bis(2,2,6,6-tetramethyl-heptanedionato), or β-diketone complexes, including alkyl-substituted and fluoro-substituted forms thereof.

Alternatively, the metal chelate is a zirconium chelate, optionally zirconium acetylacetonate, such as zirconium tetrakisacetylacetonate (also termed "Zr(AcAc)$_4$"), (including alkyl-substituted and fluoro-substituted forms thereof).

Other metal chelate examples are described in US2010/0190396A, incorporated herein by way of reference.

In one embodiment, the heat-transfer adhesion promoter in the printing composition of the present invention comprises a silicon bonded hydrogen. In another embodiment, the heat-transfer adhesion promoter in the printing composition of the present invention comprises a silicon bonded hydrogen, an organosilane and a metal chelate. In another embodiment, the heat-transfer adhesion promoter comprises a silicon bonded hydrogen, at least two organosilanes and at least one metal chelate. In another embodiment, the heat-transfer adhesion promoter comprises a silicon bonded hydrogen, methacryloxypropyltrimethoxysilane, glycidoxypropyltrimethoxysilane and zirconium acetylacetonate.

The silicone ink base composition may comprise one or more silicone ink base compositions known in the art, and the invention is not limited thereto. Alternatively, the silicone ink base is as defined in WO 2007/039763 A1, incorporated herein by way of reference.

Alternatively, the silicone ink base composition for the heat-transfer textile ink of the present invention may comprise:
(A) 100 parts by weight of a liquid polydiorganosiloxane containing at least two alkenyl radicals in each molecule,
(B) an organohydrogenpolysiloxane containing at least three silicon-bonded hydrogen atoms in each molecule, in an amount that the molar ratio of the total number of the silicon-bonded hydrogen atoms in this ingredient to the total quantity of all alkenyl radicals in ingredient (A) is from 0.5:1 to 20:1,
(C) from 5 to 50 parts by weight of a reinforcing filler, based on the amount of ingredient (A),
(D) from 0.05 to 4.5 parts by weight of a polydiorganosiloxane-polyether copolymer containing from 5 to 50 percent by mole of the polyether, based on 100 parts by weight of the combined weight of ingredients (A), (B), and (C), and
(E) a hydrosilylation catalyst.

Ingredient (A) is a liquid polydiorganosiloxane containing at least two silicon-bonded alkenyl radicals in each molecule. Suitable alkenyl radicals in ingredient (A) may contain from 2 to 10 carbon atoms, preferred for example, vinyl, isopropenyl, allyl, and 5-hexenyl. Ingredient (A) may additionally comprise silicon-bonded organic groups other than alkenyl radicals. Such silicon-bonded organic groups are typically selected from monovalent saturated hydrocarbon radicals, which may contain from 1 to 10 carbon atoms, and monovalent aromatic hydrocarbon radicals, which may contain from 6 to 12 carbon atoms, which are unsubstituted or substituted with the groups that do not interfere with curing of this inventive composition, such as halogen atoms. Alternative species of the silicon-bonded organic groups are, for example, alkyl groups such as methyl, ethyl, and propyl; halogenated alkyl groups such as 3,3,3-trifluoropropyl; and aryl groups such as phenyl.

The molecular structure of ingredient (A) is typically linear, however, there can be some branching due to the presence of trivalent siloxane units within the molecule. To achieve a useful level of physical properties in the elastomer prepared by curing the silicone ink base composition of the present invention, the molecular weight of ingredient (A) should be sufficient so that it achieves a viscosity of at least 0.1 Pa·s at 25° C. The upper limit for the molecular weight of ingredient (A) is not specifically restricted and is typically limited only by the processability of the silicone ink base composition of the present invention.

Embodiments of ingredient (A) are polydiorganosiloxanes containing alkenyl radicals at the two terminals and are represented by the general formula (I):

R'R"R'''SiO—(R"R'''SiO)$_p$—SiR"'R"R'    (I)

In formula (I), each R' is an alkenyl radical, which may contain from 2 to 10 carbon atoms, such as vinyl, allyl, and 5-hexenyl.

R" does not contain ethylenic unsaturation, Each R" may be the same or different and is individually selected from monovalent saturated hydrocarbon radical, which may contain from 1 to 10 carbon atoms, and monovalent aromatic hydrocarbon radical, which may contain from 6 to 12 carbon atoms. R" may be unsubstituted or substituted with one or more groups that do not interfere with curing of this inventive composition, such as halogen atoms. R'" is R' or R", p represents a degree of polymerization suitable for ingredient (A) to have a viscosity of at least 0.1 Pa·s at 25° C., such as from 0.1 to 300 Pa·s.

Alternatively, all R" and R'" groups contained in a compound in accordance with formula (I) are methyl groups. Alternatively at least one R" and/or R'" group in a compound in accordance with formula (I) is methyl and the others are phenyl or 3,3,3-trifluoropropyl. This preference is based on the availability of the reactants typically used to prepare the polydiorganosiloxanes (ingredient (A)) and the desired properties for the cured elastomer prepared from compositions comprising such polydiorganosiloxanes.

Examples of ingredient (A) containing ethylenically unsaturated hydrocarbon radicals only in terminal groups include, but are not limited to, dimethylvinylsiloxy-terminated polydimethylsiloxane, dimethylvinylsiloxy-terminated polymethyl-3,3,3-trifluoropropylslioxane, dimethylvinylsiloxy-terminated dimethylsiloxane-3,3,3-trifluoropropylmethylsiloxane copolymer, and dimethylvinylsiloxy-terminated dimethylsiloxane/methylphenylsiloxane copolymer or combinations thereof.

Generally, ingredient (A) has a viscosity of at least 0.1 Pa·s at 25° C., alternatively from 0.1 to 300 Pa·s, alternatively 0.1 to 100 Pa·s at 25° C.

Ingredient (B) is an organohydrogenpolysiloxane, which operates as a crosslinker for curing ingredient (A), by the addition reaction of the silicon-bonded hydrogen atoms in ingredient (B) with the alkenyl groups in ingredient (A) under the catalytic activity of ingredient (E) to be mentioned below. Ingredient (B) normally contains 3 or more silicon-bonded hydrogen atoms so that the hydrogen atoms of this ingredient can sufficiently react with the alkenyl radicals of ingredient (A) to form a network structure therewith and thereby cure the composition.

The molecular configuration of ingredient (B) is not specifically restricted, and it can be straight chain, branch-containing straight chain, or cyclic. While the molecular weight of this ingredient is not specifically restricted, the viscosity is optionally from 0.001 to 50 Pa·s at 25° C. in order to obtain a good miscibility with ingredient (A).

Ingredient (B) may be added in an amount such that the molar ratio of the total number of the silicon-bonded hydrogen atoms in ingredient (B) to the total number of all alkenyl radicals in ingredient (A) is from 0.5:1 to 20:1. When this ratio is less than 0.5:1, a well-cured composition will not be obtained. When the ratio exceeds 20:1, there is a tendency for the hardness of the cured composition to increase when heated.

Examples of ingredient (B) include but are not limited to:
(i) trimethylsiloxy-terminated methylhydrogenpolysiloxane,
(ii) trimethylsiloxy-terminated polydimethylsiloxane-methylhydrogensiloxane,
(iii) dimethylhydrogensiloxy-terminated dimethylsiloxane-methylhydrogensiloxane copolymers,
(iv) dimethylsiloxane-methylhydrogensiloxane cyclic copolymers,
(v) copolymers composed of $(CH_3)_2HSiO_{1/2}$ units and $SiO_{4/2}$ units, and
(vi) copolymers composed of $(CH_3)_3SiO_{1/2}$ units, $(CH_3)_2HSiO_{1/2}$ units, and $SiO_{4/2}$ units.

To achieve high level of physical properties that characterize some types of cured elastomer that can be prepared using the silicone ink base composition of the present invention, it may be desirable to include a reinforcing filler such as finely divided silica. Silica and other reinforcing fillers are often treated with one or more known filler treating agents to prevent a phenomenon referred to as "creping" or "crepe hardening" during processing of the curable composition.

Finely divided forms of silica are preferred reinforcing fillers. Colloidal or amorphous silicas are particularly preferred because of their relatively high surface area, which is typically at least 50 square meters per gram. Fillers having surface areas of at least 200 square meters per gram are preferred for use in the present invention. Colloidal silicas can be provided in the form of precipitated or fumed silica. Both types of silica are commercially available.

The amount of finely divided silica or other reinforcing filler used in the silicone ink composition of the present invention is at least in part determined by the physical properties desired in the cured elastomer. The silicone ink composition of the present invention typically comprises from 5 to 50 parts, alternatively from 10 to 30 parts by weight of a reinforcing filler (e.g., silica), based on the weight of the polydiorganosiloxane (ingredient (A)), alternatively 5 to 50 parts or 10 to 30 parts in each case for every 100 parts of ingredient A.

When the filler is naturally hydrophilic (e.g. untreated silica fillers), it can be treated with a treating agent. This may be prior to introduction in the composition or in situ (i.e. in the presence of at least a portion of the other ingredients of the silicone ink composition of the present invention by blending these ingredients together until the filler is completely treated and uniformly dispersed to for a homogeneous material). Alternatively, untreated filler is treated in situ with a treating agent in the presence of ingredient (A).

Optionally the filler is surface treated using for example with a fatty acid or a fatty acid ester such as a stearate, or with organosilanes, polydiorganosiloxanes, or organosilazanes hexaalkyl disilazane or short chain siloxane diols to render the filler(s) hydrophobic and therefore easier to handle and obtain a homogeneous mixture with the other ingredients. The surface treatment of the fillers makes the fillers easily wetted by the silicone polymer. These surface modified fillers do not clump, and can be homogeneously incorporated into the silicone polymer. This results in improved room temperature mechanical properties of the uncured compositions.

Optionally the filler treating agent can be any low molecular weight organosilicon compounds disclosed in the art applicable to prevent creping of organosiloxane compositions during processing.

The treating agents are exemplified but not limited to liquid hydroxyl-terminated polydiorganosiloxane containing an average from 2 to 20 repeating units of diorganosiloxane in each molecule, hexaorganodisiloxane, hexaorganodisilazane, and the like. The hexaorganodisilazane intends to hydrolyze under conditions used to treat the filler to form the organosilicon compounds with hydroxyl groups. Optionally, at least a portion of the silicon-bonded hydrocarbon radicals present in the treating agent are identical to a majority of the hydrocarbon radicals present in ingredients (A) and (B). A small amount of water can be added together with the silica treating agent(s) as a processing aid.

It is believed that the treating agents function by reacting with silicon-bonded hydroxyl groups present on the surface of the silica or other filler particles to reduce interaction between these particles.

The filler may be treated with the treating agent prior to formulating, and the treated filler is commercially available.

Ingredient (D) is a polydiorganosiloxane-polyether copolymer, which is represented by the general formula (II):

(where X is —$R^{10}$—$(OC_2H_4)_y(OA)_zE$)
wherein $R^1$, $R^7$, $R^8$, and $R^9$ are independently selected from monovalent saturated hydrocarbon radicals, which may contain from 1 to 10 carbon atoms, and monovalent aromatic hydrocarbon radicals, which may contain from 6 to 12 carbon atoms; E is identical or different and selected from hydroxy, alkoxy and may contain from 1 to 6 carbon atoms, and carboxyl; A is an alkylene and may contain from 1 to 6 carbon atoms; $R^{10}$ denotes an alkylene radical and may contain 2 to 6 carbon atoms; w is an integer of 0, 1, or 2, and must be 1 or 2 when d' is zero; s is an integer of 0 to 200, and s' is an integer of 0 to 15, where s and s' are present in amounts relative to each other such that ingredient (D) contains from 5 to 50 percent by mole of polyether per molecule; y and z are independently integer of 0 to 30, the sum of y and z being in the range from 2 to 50.

Alternatively each $R^1$, $R^7$, $R^8$, and $R^9$ is methyl. Alternatively $R^{10}$ is propylene or iso-butylene. Alternatively E is hydroxyl, methoxy, or acetoxy. Alternatively A is propylene, iso-propylene, or butylene.

Ingredient (D) generally has from 5 to 50 percent by mole of polyether units. Ingredient (D) is insoluble but can be dispersed in a polydiorganosiloxane fluid (such as ingredients (A) and (B) described above. To maintain stability after mixing, the upper limit of content of polyether is 50 percent by mole, alternatively 30 percent by mole. It is known that the percent by mole of polyether groups may be calculated using the following formula > number of siloxane units bonded to polyether groups× 100/total number of siloxane units in the molecule Ingredient (D) is added in an amount from 0.05 to 4.5 parts by weight, for every 100 parts by weight of the combined weight of ingredients (A), (B), and (C).

Curing of the heat-transfer textile ink composition of the present invention is catalyzed by ingredient (E), which is a hydrosilylation catalyst that is a metal selected from the platinum group of the periodic table, or a compound of such metal. The metals include platinum, palladium, and rhodium. Platinum and platinum compounds are preferred due to the high activity level of these catalysts in hydrosilylation reaction.

Examples of curing catalysts include but are not limited to platinum black, platinum on various solid supports, chloroplatinic acids, alcohol solutions of chloroplatinic acid, and complexes of chloroplatinic acid with liquid ethylenically unsaturated compounds such as olefins and organosiloxanes containing ethylenically unsaturated silicon-bonded hydrocarbon radicals. Complexes of chloroplatinic acid with organosiloxanes containing ethylenically unsaturated hydrocarbon radicals are described in U.S. Pat. No. 3,419,593.

The concentration of ingredient (E) in the silicone ink base composition of the present invention is equivalent to a platinum-group metal concentration from 0.1 to 500 parts by weight of platinum-group metal, per million parts (ppm), based on the combined weight of ingredients (A) and (B).

Mixtures of the aforementioned ingredients (A), (B), and (E) may begin to cure at ambient temperature. As typical with liquid silicone rubbers (LSRs), to extend the shelf-life of the silicone ink base composition or the heat-transfer textile ink, ingredients (B) and (E) can be separated into different parts and when a silicon bonded hydrogen is used it can be included with ingredient (B) if desired. The two parts are then mixed just prior to use forming the silicone ink base composition or the heat-transfer textile ink. Mixtures of aforementioned adhesion promoter ingredients comprising the organosilane and the metal chelate may also begin to react at ambient temperature. Shelf-life of the heat-transfer textile ink can be extended by separating the organosilane(s) (ii) both and the metal chelate(s) (iii) into separate parts prior to mixing to form the heat-transfer textile ink.

Also, to obtain a longer working time or pot life of the heat transfer textile ink composition of the present invention, a suitable inhibitor can be used in order to retard or suppress the activity of the catalyst. For example, the alkenyl-substituted siloxanes as described in U.S. Pat. No. 3,989,878 may be used. Cyclic methylvinylsiloxanes are preferred.

Another class of known inhibitors of platinum catalysts includes the acetylenic compounds disclosed in U.S. Pat. No. 3,445,420. Acetylenic alcohols such as 2-methyl-3-butyn-2-ol constitute a preferred class of inhibitors that will suppress the activity of a platinum-containing catalyst at 25° C. Compositions containing these inhibitors typically require heating at temperature of 70° C. or above to cure at a practical rate.

Inhibitor concentrations as low as 1 mole of inhibitor per mole of the metal will in some instances impart satisfactory storage stability and cure rate. In other instances inhibitor concentrations of up to 500 moles of inhibitor per mole of the metal are required. The optimum concentration for a given inhibitor in a given composition is readily determined by routine experimentation.

If desired, the silicone ink base composition of the present invention may comprise ingredient (F), which may be a disiloxane or a low molecular weight polyorganosiloxane containing two silicon-bonded hydrogen atoms at the terminal positions.

When ingredient (F) is a disiloxane, it is represented by the general formula $(HR^a{}_2Si)_2O$, and when ingredient (F) is a polyorganosiloxane, it has terminal units of the general formula $HR^a{}_2SiO_{1/2}$ and non-terminal units of the formula $R^b{}_2SiO$. In these formulae, $R^a$ and $R^b$ individually represent unsubstituted or substituted monovalent hydrocarbon radicals that are free of ethylenic unsaturation, which include, but are not limited to alkyl groups containing from 1 to 10 carbon atoms, substituted alkyl groups containing from 1 to 10 carbon atoms such as chloromethyl and 3,3,3-trifluoropropyl, cycloalkyl groups containing from 3 to 10 carbon atoms, aryl containing 6 to 10 carbon atoms, alkaryl groups containing 7 to 10 carbon atoms, such as tolyl and xylyl, and aralkyl groups containing 7 to 10 carbon atoms, such as benzyl.

Optionally, ingredient (F) is tetramethyldihydrogendisiloxane or dimethylhydrogen-terminated polydimethylsiloxane.

Ingredient (F) functions as chain extender for ingredient (A). In other words, ingredient (F) reacts with the alkenyl radicals of ingredient (A), thereby linking two or more molecules of ingredient (A) together and increasing its effective molecular weight and the distance between potential crosslinking sites.

Ingredient (F) may be added in an amount from 1 to 10 parts by weight, based on the weight of ingredient (A), alternatively 1 to 10 parts per 100 parts of ingredient A.

The effect of the chain extender on the properties of the cured elastomer composition is similar to that of using a higher molecular weight polyorganosiloxane, but without the processing and other difficulties associated with high viscosity curable organosiloxane composition.

Chain extenders suitable for use in the present compositions have viscosities from about 0.001 to 1 Pa·s at 25° C., optionally from about 0.001 to 0.1 Pa·s, to maximize the concentration of silicon-bonded hydrogen atoms and minimize the viscosity of the elastomer composition of the present invention.

The number of silicon bonded hydrogen groups provided in ingredient (F), when present, and in ingredient (B) is sufficient to provide the degree of crosslinking required to cure the elastomer composition of the present invention to the desired physical property. The total quantity of silicon-bonded hydrogen atoms contributed by the crosslinker is such that the molar ratio of silicon bonded hydrogen atoms contributed by both the crosslinker and the chain extender to the vinyl or other alkenyl radicals present in the elastomer composition of the present invention is from 0.5 to 20.

The heat-transfer textile ink of the present invention may be prepared by combining all of ingredients or components at ambient temperature. Any mixing techniques and devices described in the prior art can be used for this purpose. The particular device to be used will be determined by the viscosities of ingredients and the final curable coating composition of the ink. Suitable mixers include but are not limited to paddle type mixers and kneader type mixers. Cooling of ingredients during mixing may be desirable to avoid premature curing of the ink composition.

According to another embodiment of the present invention, the heat-transfer textile ink may further include one or more heat-transfer glues. Such glues are well known in the art, and are not further described herein. Various polyester glues are well known for this purpose.

The heat-transfer textile ink of the present invention is useable in a laminated heat-transfer product for heat-transfer printing. Such heat-transfer products are sometimes also termed "labels" or "laminates" or "decals". They provide an easy way to provide an image or indicia in the form of flat, and usually thin, sheets, able to be easily mass-produced and transported for easy and rapid addition to suitable substrates. Such substrates include fabrics and textiles, such as clothing, such as t-shirts, scarves, 'tops', etc., as well as substrates otherwise fixed in their location. The laminated products are usually located over the substrate, heat is applied, following removal of one or more layers of the laminated product to leave a lasting image on the substrate.

A typical construction for heat-transfer products is one or more liners, in particular a top liner for subsequent release away from the image, one or more coats including the or each pigment, etc. to create the intended image, and an adhesive or glue layer, and optionally one or more 'backing' layers adapted to be removed prior to the printing process.

Thus, according to a second aspect of the present invention, there is provided a laminated heat-transfer product including a heat-transfer coat, said heat-transfer coat comprising a heat-transfer textile ink as defined herein.

Alternatively, the heat-transfer product of the present invention comprises at least the layers of a liner, a top heat-transfer coat, a base heat-transfer coat and a glue.

According to a third aspect of the present invention, there is provided a heat-transfer product comprising:
(a) one or more heat-transfer glues;
(b) a heat-transfer adhesion promoter as defined herein.

In this way, the heat-transfer adhesion promoter can be added into the glue of a heat transfer product, as an alternative or in addition to inclusion in a heat-transfer textile ink.

According to another aspect of the present invention, there is provided use of a heat-transfer adhesion promoter as defined herein as an adhesion promoter between one or more heat-transfer coats and a glue during a heat-transfer printing process.

As mentioned above, heat-transfer printing is a technique or process for the rapid application of an image from a heat transfer product to various substrates. Heat-transfer products are generally laminates having an image thereon created by one or more coats, which are intended to be used to provided pictorial and/or print designs or messages (e.g. labels, decals, etc.) that can be adhered to substrates in a quick and easy printing process, particularly at the location of substrate sale, or due to the fixed location of the substrate.

Thus, according to a fourth aspect of the present invention, there is provided a heat-transfer printing process for transferring an image from one or more coats in a laminated heat-transfer product to a substrate alternatively a textile substrate comprising at least the steps of:
(i) providing a laminated heat-transfer product as defined herein;
(ii) combining the laminated heat-transfer product of step (i) with the substrate;
(iii) transferring the image from the one or more coats of the laminated heat-transfer product onto the substrate.

The skilled man is aware that one or more of further ingredients or components can be used in a heat-transfer textile ink, such as, but not limited to, flame-retardants, ultraviolet light stabilisers, non-reinforcing fillers such as calcium carbonate, and the like, and that a heat-transfer product including a heat-transfer textile ink of the present invention may include one or more further ingredients or components or layers.

Many substrates may be coated with the heat transfer textile ink composition of the present invention including textile and other substrates. Textile substrates able to be coated with the heat-transfer textile ink of the present invention include, but are not limited to, cotton, polyester, nylon and mixtures thereof together, or in combination with other materials such as a mixture of nylon comprising from 2 to 20% of an elasticated fibre such as Lycra (trade mark of Du Pont company).

Other substrates for which the heat-transfer textile ink of the present invention may be used include labels, patches, plastic components, in particular hard plastic components in vehicles such as automobiles, fabric components in vehicles, leather, paper, metal, plastics.

Thus, according to another aspect of the present invention, there is provided an imprinted textile garment or article including the heat-transfer textile ink as defined herein, or including the heat-transfer product as defined herein.

EXAMPLES

The following examples are included to demonstrate preferred embodiments of the invention. It should be appreciated by those of skill in the art that the techniques disclosed in the examples which follow represent techniques discovered by the inventor to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

In the examples, the following ingredients and methods were used:
Ingredients:
Silicone Ink Base is Dow Corning® LCF 9601 textile printing ink base
Catalyst is Dow Corning® LCF 9600 Catalyst
White Pigment is Dow Corning® LPX White 5
Retardant is Dow Corning® LC-9608 printing retardant
Pre-Mix Additive contained one or more of:
 Hydrogen bonded silicon is Trimethylsiloxy-terminated polydimethyl-methylhydrogensiloxane having a viscosity of 20 cst at 25° C.
 Epoxysilane is Glycidoxyisopropyltrimethoxysilane
 Methacryloxysilane is Methacryloxypropyltrimethoxysilane
 ZrAcAc is Zirconium tertrakisacetylacetonate from Orgatix ZC 152, Matsumoto, Japan
Glues 374 and 376 are from Schaetti, Switzerland and composed of thermoplastic polyester in powder.

General Methodology Used:

A blend of white pigment paste, silicone ink base and catalyst and various pre-mix additives were made and then mixed in a Dental mixer 30 sec at 3500 rpm. The blend was then put on a PVC film with the manual bar at 60μ or 120μ. The thermoplastic powder glue was added on the wet silicone coating and the excess removed. This was then put in the oven at 130° C. or 150° C. (depending on the glue used) for 2 minutes to dry the silicon and melt the glue. After curing, it was cooled and a piece of fabric was laminated on top using a hot iron. The film was then delaminated and the appearance and the adhesion of the silicone coating on the fabric (Standard Cotton from WFK) was checked.

The printing adhesion was measured using Taber abrader, using abrasive wheels H18 and additional weights of 250 g.

The printing was considered as "bad" when the first sign of delaminating occurred before 50 cycles. The printing is considered as "OK" when no sign of delaminating occurred before 1000 cycles.

Formulations and Results

| Formulation | Components | Quantity |
|---|---|---|
| 1 | Silicone Ink Base | 100 g |
| | Catalyst | 4.5 g |
| | White pigment | 30 g |
| | Pre-Mix - hydrogen bonded silicon | 1 g |
| | Retardant | 1 g |
| 2 | Silicone Ink Base | 100 g |
| | Catalyst | 4.5 g |
| | White pigment | 30 g |
| | Pre-mix - epoxysilane/methacryloxy silane/ZrAcAc | 3 g |
| 3 | Silicone Ink Base | 100 g |
| | catalyst | 4.5 g |
| | White pigment | 30 g |
| | Pre-mix - epoxysilane/methacryloxy silane/ZrAcAc | 1 g |

| System + White pigment | Coating thickness | Glue | Coating appearance | Coating adhesion | Washes resistance (5 washes) |
|---|---|---|---|---|---|
| Silicone Ink Base (REF)) | 120μ | 374 | OK | Bad | Bad |
| Formulation 1 | 60μ | 374 | OK | OK | OK |
| Formulation 2 | 60μ | 374 | OK | OK | OK |
| Formulation 3 | 60μ | 374 | OK | Limited | Limited to 1 wash |

Further examples 4-6 using additives in the glue:

| Formulation | Components | Quantity |
|---|---|---|
| 4 (REF) | Silicone Ink Base | 100 g |
| | Catalyst | 4.5 g |
| | White pigment | 30 g |
| | Schaetti fix 374 | Scattered on the surface of the wet ink |
| 5 | Silicone Ink Base | 100 g |
| | Catalyst | 4.5 g |
| | White pigment | 30 g |
| | Schaetti fix 374 + Pre-mix –1% hydrogen bonded silicon | Scattered on the surface of the wet ink |
| 6 | Silicone Ink Base | 100 g |
| | catalyst | 4.5 g |
| | White pigment | 30 g |
| | Schaetti fix 374 + Pre-mix –2% epoxysilane/methacryloxy silane/ZrAcAc | Scattered on the surface of the wet ink |

The thermoplastic glue was melted in a conventional oven then the pre-mix additives were added using a spatula. After the mixture cooled, the glue was frozen and ground to obtain the thermoplastic powder. This powder was then used on the freshly applied ink before curing to ensure transfer printability.

| System + White pigment | Printing thickness | Printing appearance | Printing adhesion |
|---|---|---|---|
| Formulation 4 (REF) | 60μ | OK | No |
| Formulation 5 | 60μ | OK | OK |
| Formulation 6 | 60μ | OK | OK |

We claim:

1. A heat-transfer textile ink comprising:
   (a) silicone ink base composition;
   (b) a pigment;
   (c) a heat-transfer adhesion promoter being one or more of the group comprising:
      (i) a heat-transfer adhesion promotor comprising a hydrogen bonded silicon;
      (ii) an organosilane;
      (iii) a metal chelate; and
   one or more heat-transfer glues.

2. The heat-transfer textile ink of claim 1 wherein the heat-transfer adhesion promoter comprises the heat-transfer adhesion promotor comprising the hydrogen bonded silicon.

3. The heat-transfer textile ink of claim 1 wherein the heat-transfer adhesion promoter comprises at least one organosilane, alternatively two different organosilanes, and at least one zirconium chelate.

4. The heat-transfer textile ink of claim 1 wherein the heat-transfer adhesion promoter comprising the hydrogen bonded silicon of group (i) comprises:

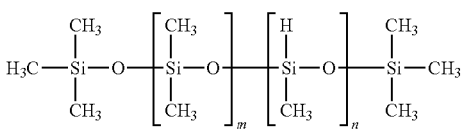

wherein m is in the range 0 to 120, and n is in the range 1 to 120.

5. The heat-transfer textile ink of claim 4 wherein the heat-transfer adhesion promoter comprising the hydrogen bonded silicon has a viscosity of 20 cst, m is 0, n is on average equal to 60, and an average molecular weight of 2500.

6. The heat-transfer textile ink of claim 1 wherein the organosilane of group (ii) comprises either:
   (i) the formula $R^3_b SiR^4_{(4-b)}$, where each $R^3$ is independently a monovalent organic group; each $R^4$ is an alkoxy group; and b is 0, 1, 2, or 3; or
   (ii) the formula $R^5_c R^6_d Si(OR^5)_{4-(c+d)}$ where each $R^5$ is independently a substituted or unsubstituted, monovalent hydrocarbon group having at least 1 carbon atom and each $R^6$ contains at least one SiC bonded group having an adhesion-promoting group, c is 0, 1 or 2, d is 1 or 2, and the sum of c+d is not greater than 3.

7. The heat-transfer textile ink of claim 6 wherein the organosilane is one or more of a trialkoxysilane.

8. The heat-transfer textile ink of claim 1 wherein the metal chelate of group (iii) comprises metal tetraacetylacetonate, hexafluoroacetylacetonate, trifluoroacetylacetonate, tetrakis (ethyltrifluoroacetylacetonate), tetrakis(2,2,6,6-tetramethyl-heptanedionato), dibutoxy bis(ethylacetonate), diisopropoxybis(2,2,6,6-tetramethyl-heptanedionato), or β-diketone, including alkyl-substituted and fluoro-substituted forms thereof.

9. The heat-transfer textile ink of claim 8 wherein the metal chelate is a zirconium chelate.

10. The heat-transfer textile ink of claim 1 wherein the heat-transfer adhesion promoter comprises methacryloxypropyltrimethoxysilane, glycidoxypropyltrimethoxysilane and zirconium acetylacetonate.

11. The heat-transfer textile ink of claim 1 wherein the silicone ink base composition comprises:
    (A) 100 parts by weight of a liquid polydiorganosiloxane containing at least two alkenyl radicals in each molecule,
    (B) an organohydrogenpolysiloxane containing at least three silicon-bonded hydrogen atoms in each molecule, in an amount that the molar ratio of the total number of the silicon-bonded hydrogen atoms in ingredient (B) to the total quantity of all alkenyl radicals in ingredient (A) is from 0.5:1 to 20:1,
    (C) from 5 to 50 parts by weight of a reinforcing filler, based on the amount of ingredient (A),
    (D) from 0.05 to 4.5 parts by weight of a polydiorganosiloxane-polyether copolymer containing from 5 to 50 percent by mole of the polyether, based on 100 parts by weight of the combined weight of ingredients (A), (B), and (C), and
    (E) a hydrosilylation catalyst.

12. A laminated heat-transfer product including a heat-transfer coat, said heat-transfer coat comprising the heat-transfer textile ink of claim 1.

13. The laminated heat-transfer product of claim 12 comprising at least the layers of a liner, a top heat-transfer coat, a base heat-transfer coat and said heat-transfer glue.

14. A heat-transfer printing process for transferring an image from one or more coats in a laminated heat-transfer product to a textile substrate comprising the steps of:
    (i) providing the laminated heat-transfer product of claim 12;
    (ii) conjoining the laminated heat-transfer product of step (i) with the textile substrate; and
    (iii) transferring the image from the one or more coats of the laminated heat-transfer product onto the substrate.

15. An imprinted textile garment or article including the heat-transfer textile ink of claim 1.

16. An imprinted textile garment or article including the laminated heat-transfer product of claim 12.

17. A heat-transfer printing process for transferring an image from one or more coats in a laminated heat-transfer product to a textile substrate comprising the steps of:
    (i) providing the laminated heat-transfer product of claim 13;
    (ii) conjoining the laminated heat-transfer product of step (i) with the textile substrate; and
    (iii) transferring the image from the one or more coats of the laminated heat-transfer product onto the substrate.

18. An imprinted textile garment or article including the laminated heat-transfer product of claim 13.

19. The heat-transfer textile ink of claim 6 wherein the adhesion-promoting group is at least one of an amino, an epoxy, a mercapto, or an acrylate group.

20. The heat-transfer textile ink of claim 7 wherein the trialkoxysilane is one or more of the group comprising vinyltriethoxysilane, (methacryloxypropyl)trimethoxysilane, vinyltrimethoxysilane, vinyltriacetoxysilane, glycidoxypropyltrimethoxysilane, or combinations thereof.

* * * * *